(12) United States Patent
Bhattacharya et al.

(10) Patent No.: US 7,555,756 B2
(45) Date of Patent: Jun. 30, 2009

(54) DYNAMIC RECONFIGURATION OF MULTIMEDIA STREAM PROCESSING MODULES

(75) Inventors: Syon Bhattacharya, Redmond, WA (US); Robin Speed, Winchester (GB)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 10/853,371

(22) Filed: May 25, 2004

(65) Prior Publication Data

US 2004/0255309 A1  Dec. 16, 2004

Related U.S. Application Data

(62) Division of application No. 09/629,234, filed on Jul. 31, 2000, now Pat. No. 6,983,464.

(51) Int. Cl.
*G06F 13/00* (2006.01)
(52) U.S. Cl. .................. 719/328; 709/231; 709/232
(58) Field of Classification Search ................ 719/328; 709/231, 232
See application file for complete search history.

(56) References Cited

U.S. PATENT DOCUMENTS

| 5,634,058 | A |   | 5/1997 | Allen et al. |
| 5,642,477 | A | * | 6/1997 | de Carmo et al. ........ 715/500.1 |
| 5,758,086 | A |   | 5/1998 | Maegawa |
| 5,815,707 | A |   | 9/1998 | Krause et al. |
| 6,408,329 | B1 | * | 6/2002 | Kailash ................ 709/212 |
| 6,618,368 | B1 |   | 9/2003 | Tanigawa et al. |
| 6,691,175 | B1 |   | 2/2004 | Lodrige et al. |
| 6,920,635 | B1 | * | 7/2005 | Lodrige et al. .......... 719/314 |

OTHER PUBLICATIONS

Data Flow in the Filter Graph.
About Filter Graph Architecture.
Understanding Time and Clocks in DirectShow.

* cited by examiner

*Primary Examiner*—Andy Ho

(57) ABSTRACT

A method to dynamically reconfigure multimedia streaming processing modules using interfaces that allow applications and modules to seamlessly change the configuration of streaming modules. Reconfigurations are initiated by a processing module in a stream or by an application by sending a notification packet through the processing modules in the portion of the stream being changed that informs that modules that a change is being made and the modules to complete processing of its data. Modules affected by the change are stopped once the notification packet is received by all processing modules in the stream being changed and modules are then added, removed, or replaced and the portion of the stream being changed resumes processing the data stream. The modules at the beginning of the portion being changed can resume operation as soon as they are reconnected to other modules.

6 Claims, 5 Drawing Sheets

DYNAMIC RECONFIGURATION OF MULTIMEDIA STREAM PROCESSING MODULES

TECHNICAL FIELD

This invention relates generally to electronic data processing, and, more particularly, relates to managing the flow of streaming data through processing modules in a computer system.

BACKGROUND OF THE INVENTION

Digitally based multimedia, the combination of video and audio in a digital format for viewing on a computer or other digital device, is rapidly increasing in capacity and proliferation. Nearly every new personal computer manufactured today includes some form of multimedia, and are often shipped with digital products such as cameras and video recorders. Multimedia is also becoming increasingly prevalent in the Internet realm as the growth of the Internet steadily and rapidly continues. Along with this growth has come increased performance expectations by the users of such computer equipment. These increased user expectations extend not only to hardware capability, but also to the processing capability of the data itself.

A technique known as streaming has been developed for multimedia applications to satisfy these increasing expectations. Streaming allows data to be transferred so that it can be processed as a steady and continuous stream. This has the benefit that data can be displayed or listened to before the entire file has been transmitted, a must for large multimedia files. Streaming data almost always requires some form of processing among various modules in a computer system. Unfortunately, a wide variety of different formats exist to stream the data making it difficult to uniformly process this data. Additionally, a wide variety of different methods of compression and decompression of audio and video data and software exist, which further complicates the processing of this streaming data. For example, video data might be in ASF, WMA, AVI, CIF, QCIF, SQCIF, QT, DVD, MPEG-1, MPEG-2, MPEG-4, RealVideo, YUV9, or any other type of format. Audio data might be in MP3, AIFF, ASF, AVI, WAV, SND, CD, AU or other type of format.

In many scenarios, different types of modules within the computer system need to be connected together to process the streaming data. For example, an audio and video clip might initially require MPEG decoding in a dedicated hardware module, rasterizing of the video fields in another hardware module, digital filtering of the audio in a software module, insertion of subtitles by another software module, parsing of the audio data to skip silent periods by a software module, D/A conversion of the video in a video adapter card, and D/A conversion of the audio in a separate audio card. Additionally, there are times when the particular modules need to be changed. For example, changes in the type of input data may require a different decoding module, a user may want to add an effect filter to a video stream, or a network may signal that the bandwidth has changed, thus requiring a different compression format. Users now expect these changes be completed quickly and with minimum interruption.

In existing systems, any time such a change is made to the processing elements, all of the modules connected together are stopped, the required changes are made, and the modules are restarted. In many instances, modules flush the data being processed, resulting in a significant amount of data loss and delay in stream processing. This presents a significant disadvantage and is a source of consumer dissatisfaction with current multimedia systems.

Accordingly, there exists a need for a multimedia data streaming system that is capable of handling dynamic format changes seamlessly without requiring the reconfiguration of modules, and that is capable of reconfiguring modules when necessary without loss of data.

SUMMARY OF THE INVENTION

In view of the above described problems existing in the art, the present invention provides a method to dynamically reconfigure processing modules. Protocols are provided that reconfigure processing module connections seamlessly and that provide the flexibility to adapt to changing standards.

Reconfigurations can be initiated by an individual processing module in a stream, or by an application that utilizes such modules to process data. A reconfiguration is initiated by the processing module or the application sending a notification packet through the processing modules in the portion of the stream that is to be changed. The notification informs the modules that a change is to be made and that they should complete the processing of their data. Only those modules that are affected by the change are stopped by the processing module or the application once the notification packet has been received by all of the processing modules in the stream being changed. Modules are then added or removed to the stream, after which the processing of the data stream resumes.

The stream being changed can resume processing data before the notification packet is received by all processing modules. The modules in the portion being changed are stopped as soon as they have finished processing data. These modules are then switched over to the new configuration and operation is resumed as soon as they are reconnected to other modules.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
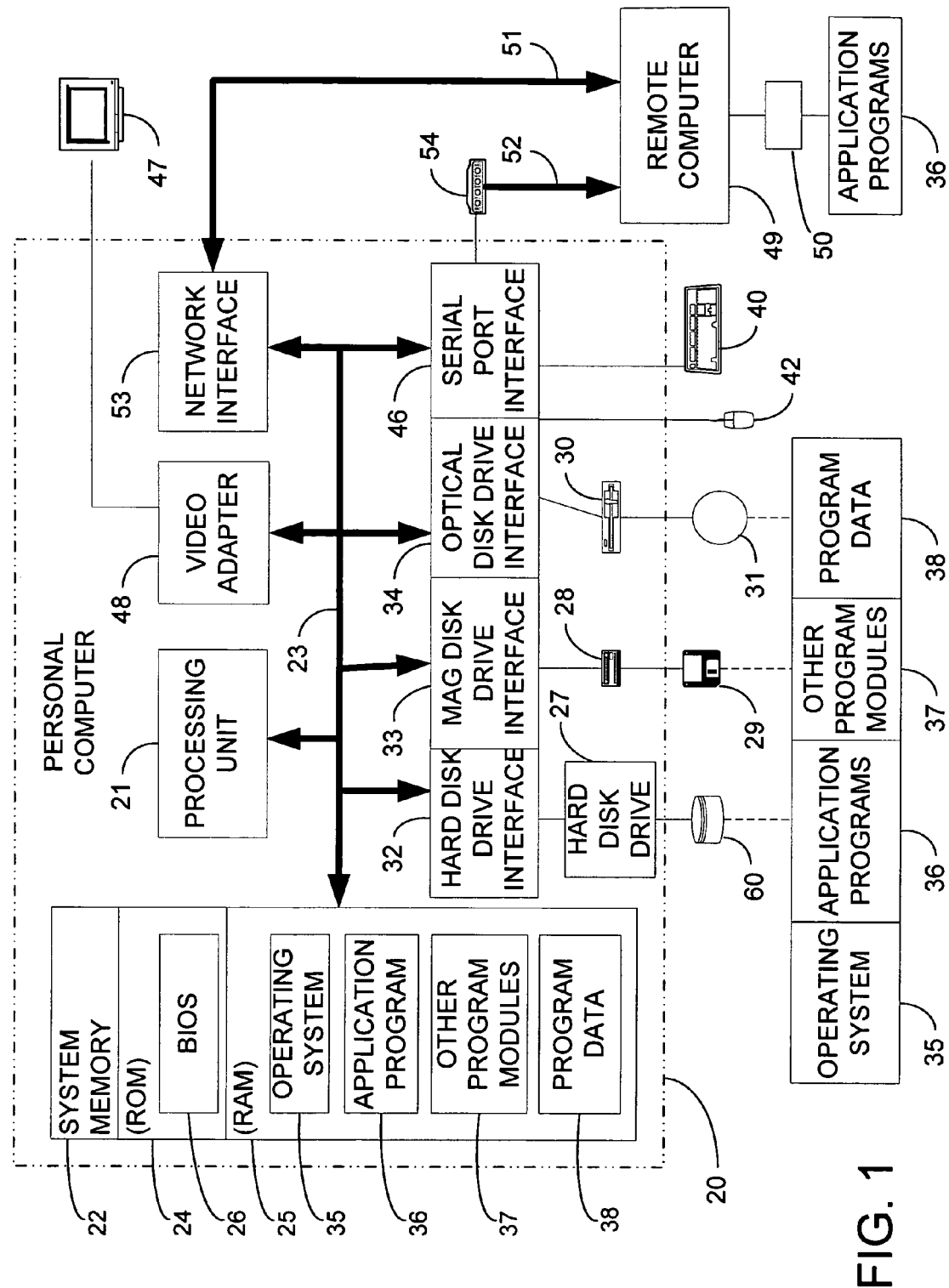
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including streaming routers, hand-held devices, multi-processor systems, microprocessor based or programmable consumer electronics, network PCs, minicomputers, mainframe computers, embedded systems, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware. The invention will be described in the context of the Microsoft Windows operating system. One of skill in the art will appreciate that the invention is not limited to this implementation and can be used in other operating systems. To provide a better understanding of the invention, an overview of the relevant portions of the Microsoft Windows operating system will be described.

The Windows Driver Model (WDM) is a common set of services that allow the creation of drivers having compatibility with both the Microsoft Windows 98 operating system and the Microsoft Windows 2000 operating system. Each WDM class abstracts many of the common details involved in controlling a class of similar devices. WDM utilizes a layered approach, implementing these common tasks within a WDM "class driver." Driver vendors may then supply smaller "minidriver" code entities to interface the hardware of interest to the WDM class driver thereby providing interoperability with these operating systems.

WDM provides, among other functions, a stream class driver to support kernel-mode streaming, which allows greater efficiency and reduced latency over user mode streaming. The stream architecture utilizes an interconnected organization of filters, and employs the mechanism of "pins" to communicate to and from the filters, and to pass data. Both filters and pins are Component Object Model (COM) objects. The filter is a COM object that performs a specific task, such as transforming data, while a pin is a COM object created by the filter to represent a point of connection for a unidirectional data stream on the filter. Input pins accept data into the filter while output pins provide data to other filters. Filters and pins preferably expose control interfaces that other pins, filters, or applications can use to configure the behavior of those filters and pins. An embodiment of the invention will be described by reference to the filters and pins of the WDM model hereinafter.

Figure 2:
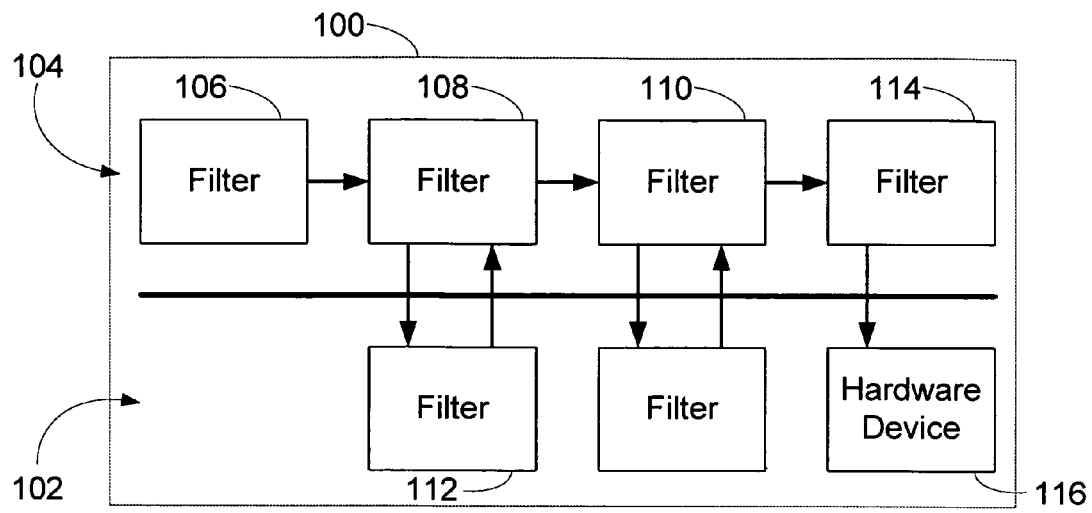
FIG. 2 is a block diagram generally illustrating data flow between filters in an operating system.

Turning now to FIG. 2, filters reside in user mode 104 and in kernel mode 102 of the Windows operating system 100. The kernel mode 102 allows access to all memory and issuance of all CPU instructions. The user mode 104 allows limited access to memory and exposes a limited set of interfaces to CPU instructions. Data from an application or an external source is sent to filters for processing. The data is then sent back to its source, to hardware or another application, or to an external operating system. A representative example of this data flow in the Windows operating system 100 is shown in FIG. 2. Filter 106 residing in user mode 104 receives the data and may transform it in some manner. The data is then sent to filter 108 for further transformation. After filter 108 processes the data, it sends the data to filter 110 for further transformation. Alternatively, filter 108 could send the data to filter 112 residing in kernel mode 102 for transformation prior to filter 110. Filter 110 further transforms the data before sending it to filter 114 for further transformation. Finally, filter 114 sends the transformed data to hardware device 116. Hardware device 116 may be the screen of a CRT, a sound card, a video card, or any other type of device. While FIG. 2 illustrates processing first in the user mode, an application, an external source, or a hardware component may send its data directly to a filter or hardware device residing in kernel mode.

Microsoft DirectShow, part of the WDM, is an architecture that facilitates the control of multimedia data streams via modular components or filters. A kernel streaming proxy module such as KSProxy, a Microsoft DirectShow filter, is used to control and communicate with kernel mode filters. KSProxy provides a generic method of representing kernel mode streaming filters as DirectShow filters. Running in user mode, KSProxy accepts existing control interfaces and translates them into input/output control calls to the WDM streaming drivers.

Figure 3:
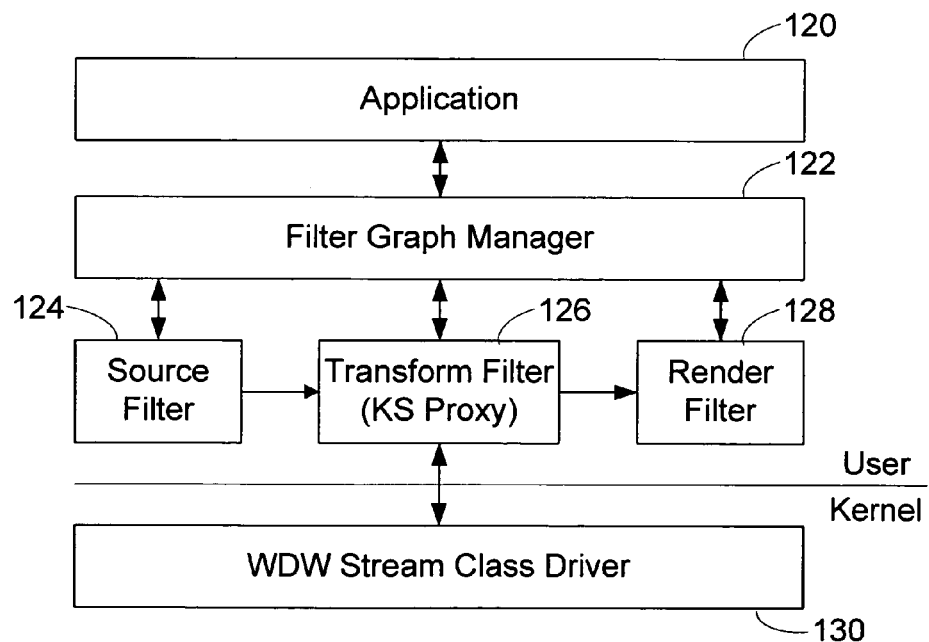
FIG. 3 is a block diagram generally illustrating a filter graph in relation to computer system components.

Turning now to FIG. 3, an application 120 communicates with a filter graph manager 122 when the application 120 wants to process streaming data. Filter graph manager 122 automatically creates the filter graph by invoking the appropriate filters and connecting the appropriate pins. Source filter 124 receives streaming data from the application or an external source (not shown). The streaming data can be obtained from a file on disk, a network, a satellite feed, an Internet server, a VCR, etc., and source filter 124 introduces the data into the filter graph. Transform filter 126 takes the data, processes it in some manner, and then passes it on. While FIG. 2 shows transform filter 126 as a single filter, one skilled in the art will recognize that transform filter 126 may consist of multiple filters. For example, transform filter 126 could be a video decompressor and an audio decompressor. Transform filter 126 may also serve as a kernel streaming proxy module to access the stream class driver 130 as discussed above. Renderer filter 128 receives the data from transform filter 126 and renders the data. Typically, the data is rendered to a hardware device 116, but it could be rendered to any location that accepts the renderer output format, such as memory or a disk file. It should be noted that an application 120 may automatically create the filter graph by invoking the appropriate filters and connecting the appropriate pins directly rather than letting the filter graph manager 122 configure the filters.

Figure 4:
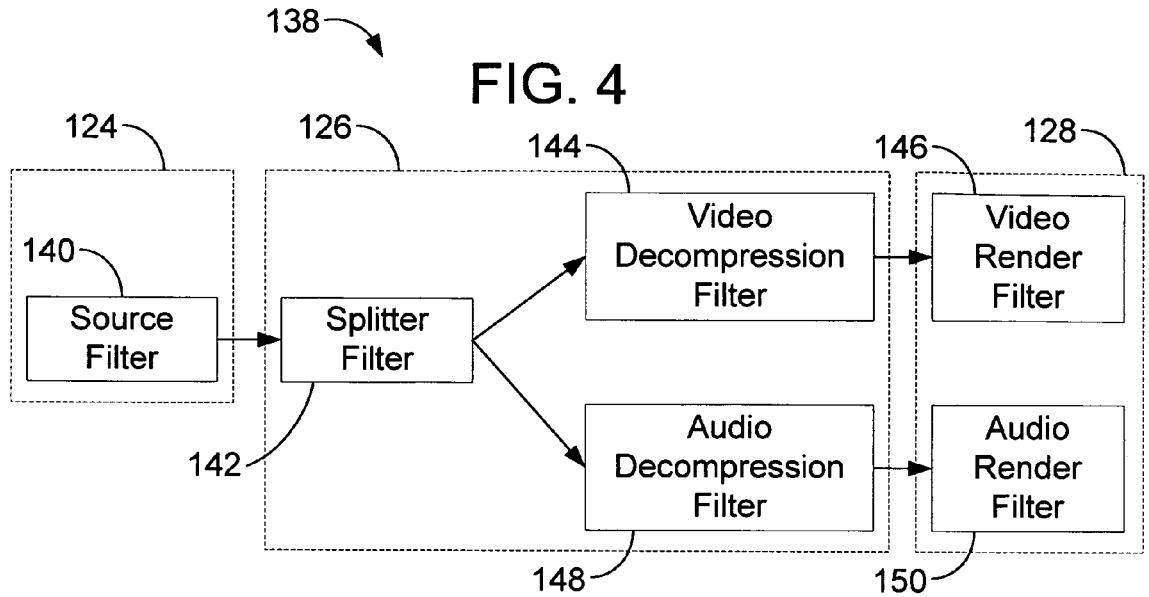
FIG. 4 is a block diagram illustrating a filter graph.

FIG. 4 shows a typical filter graph 138 that plays back a compressed video from a file stored on a disk. The filter graph 138 of FIG. 4 is just one configuration of the graph illustrated in FIG. 3. As recognized by those skilled in the art, other configurations can be used. Source filter 140 reads data off the disk. Splitter filter 142 splits the data into audio and video streams. Video decompression filter 144 transforms the compressed video stream into a decompressed video stream, and video renderer filter 146 displays the video on a screen (not shown). Audio decompression filter 148 transforms the compressed audio stream into a decompressed audio stream, and audio renderer filter 150 sends the audio to a sound card (not shown).

Figure 5A:
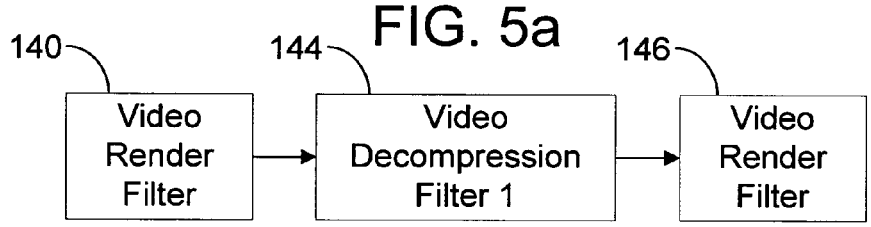
FIG. 5 is a block diagram illustrating a filter graph before and after the filter graph has been changed.
Figure 5B:
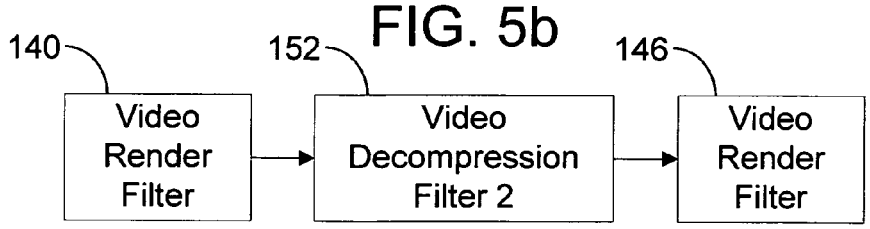

In many instances, it becomes necessary to change the filter graph by adding, removing, or replacing a filter module. For example, if the video format were to change, video decompression filter 144 would need to be replaced with a different decompression filter. FIGS. 5a and 5b show a single set of streaming components where the video decompression module 144 is replaced with the video decompression module 152. A single streaming path has been presented for purposes of explanation, however it should be noted that multiple paths may exist and that they may be reconfigured independently or in parallel. Further, multiple filters may be added, replaced, or removed as required. In order to achieve uninterrupted streaming of data through the filter graph, the change to be made to the graph must first be identified, and the modules (i.e., filters) to be added, removed, or replaced must be determined. In some cases, not all modules in the section of the streaming path being changed have the capability to dynamically reconfigure a graph. These legacy modules do not have the capability to accept changes to their streaming connection while they are active. If there are legacy modules in the section of the graph being changed, then the section of the graph being changed is expanded to include modules that support dynamic reconfiguration so that all of the input and output edges support such dynamic reconfiguration. For example, if the video decompression filter 144 (see FIG. 4) is to be replaced and the splitter filter 142 does not support dynamic reconfiguration, then the splitter filter 142 would need to be stopped when the decompression filter 144 is changed. To satisfy the criteria that all input and output edges support dynamic reconfiguration, the section being changed is expanded to include the source filter 140, which supports dynamic reconfiguration. The input edge module becomes the source filter 140 while the output edge modules remain as the video renderer filter 146 and audio renderer filter 150.

Figure 6:
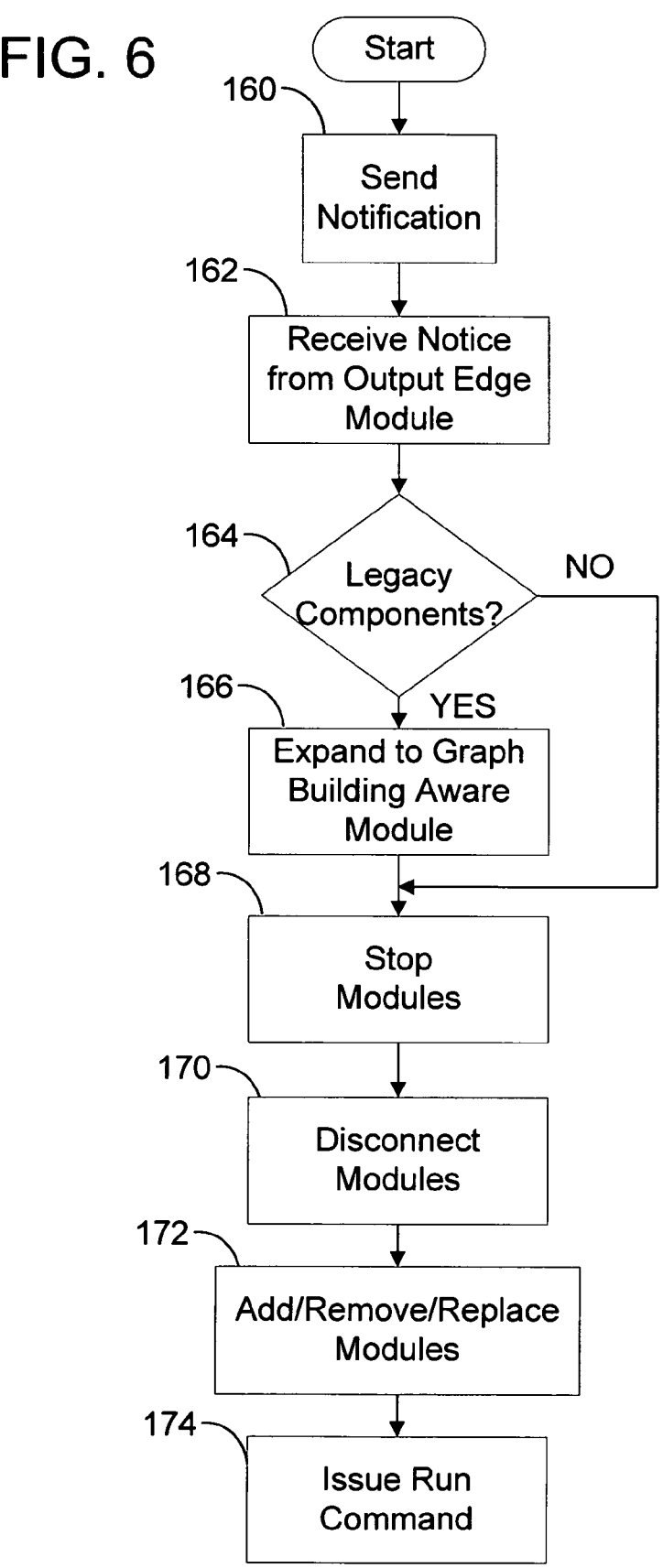
FIG. 6 is a flow chart illustrating a reconfiguration process in which a filter graph is being reconfigured in accordance with the present invention.

FIG. 6 shows a flow diagram of the particular steps taken to add, remove, or replace modules within the filter graph. Either an individual module within the filter graph or an application can initiate a change to a filter graph. If there are legacy modules in the section of the graph being changed (step 160), then the section of the graph being changed is expanded to include modules that support dynamic reconfiguration so that all of the input and output edges support such dynamic reconfiguration (step 162). When this change is initiated, the module or application sends a notification packet to modules within the filter graph section that is to be changed (step 164). For purposes of explanation, splitter filter 142 or application 120 may decide to change a section of the filter graph.

The filter graph section to be changed has an input edge and an output edge. An edge is an established connection between the output pin of one module and the input pin of another module. The input edge is at the beginning of the section being changed, and the output edge is at the end of the section being changed. A module 142 initiating the change inserts the notification packet directly into the streaming path using a "NotifyEndofStream" command, which causes a specified module to signal when all the data has been pushed through the streaming path. An application 120 initiating the change, on the other hand, issues a "Block" command asynchronously on output pins of modules located along the input edges of the section being changed. Any module receiving the block command temporarily blocks the flow of data from its output pin until it receives another block command. The module receiving the block command processes all data it has in buffers before it blocks the flow of data. Once the flow of data is stopped, the application 120 inserts the notification packet.

This notification packet is processed in sequence with the data. Therefore, it will not be received by modules in the section being changed until after the module has received all data from the data stream sent prior to the notification packet. This ensures that no data will be flushed. Modules having a single input and output send the packet after all data output has been generated for the input data received prior to the receipt of the notification packet. Modules that split single streams of data into multiple streams send this notification packet to each output for each of the multiple streams only after it has sent out all other data. Modules that merge data streams, on the other hand, send a notification packet to their outputs after receiving a notification from all inputs and after having processed and sent on all of the data previously received on its inputs. If a renderer module is within the section being changed or at the edge of a section being changed, the notification packet preferably passes through the renderer module. Once the notification packet has been processed through the filter graph, the module 142 or application 120 receives an indication that the notification packet has been received at all output edges (step 166).

The module 142 or application 120 then commands the modules within the section to be changed to transition to a stop state (step 168). If any modules are going to be removed, the pins of those modules are disconnected (step 170). In one embodiment, the pins of legacy components within the section to be changed are not disconnected if they are not connected to either a module being removed or to a module being added. The modules that are to be removed or replaced are then removed from the graph and the modules to be added are added to the graph (step 172). The removed modules can be moved into a cache if it is likely that an application 120 or module 142 will revert to an "old" configuration or stream format in the future. For example, if a change occurs as a result of a bandwidth change, it is reasonable to assume that the bandwidth may change back thereby allowing the modules that were removed or replaced to be reused.

The pins of the modules being added and the pins of the modules remaining in the filter graph are then connected to one another as appropriate. For example, when video decompression filter 152 is added to replace video decompression filter 144 illustrated in FIGS. 5a and 5b, the output pins of splitter filter 142 are connected to the input pins of video decompression filter 152 and the output pins of video decompression filter 152 are connected to the input pins of video renderer filter 146. Once the input and output pins are properly connected, the modules within the section are commanded to transition to a run state (step 174). Data streaming through the changed section of the graph is then resumed.

Figure 7:
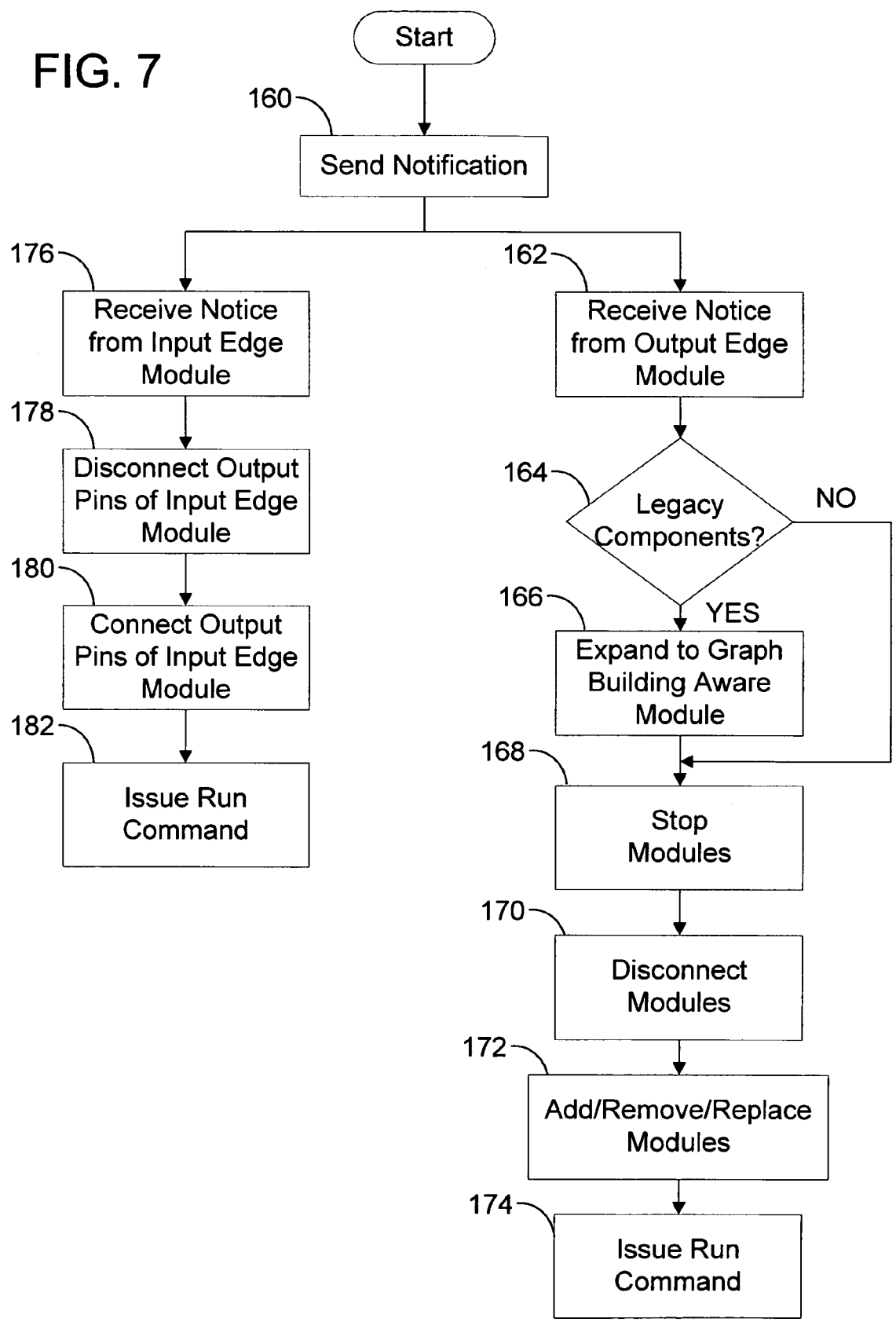
FIG. 7 is a flow chart illustrating a reconfiguration process in which a filter graph is being reconfigured by adding a new streaming path while the old streaming path is still processing data.

In many instances, a considerable length of processing time may be required for modules to process data that was already in the section of the streaming path to be changed. In situations like these, it may be more efficient to begin streaming new data before the notification packet is received at all output edges of the graph. For example, the video decompression filter 152 (see FIG. 5b) can begin processing new data while the video decompression filter 144 is still processing data. As illustrated in FIG. 7, streaming new data before the notification packet is received at all output edges of the graph is accomplished by disconnecting output pins of the modules located at an input edge of the graph section being changed (step 180) once these modules located at that input edge are finished streaming data to the "old" configuration (step 178). The modules that are to be removed or replaced are then removed from the graph and the modules to be added are added to the graph (step 182). The output pins of the input module are then connected to the newly added module (step 184). The added module is then commanded to change to a run state, and the module located at the input edge resumes data streaming. In this way, the module at the input edge sends data to the newly added module (step 186). Once the notice is received at the output edge, the modules of the "old" configuration are stopped (step 168) and disconnected (step 170). The input pins of the output edge module are then connected to the "new" configuration (step 176) and data streaming through the output edge is resumed. In cases where a legacy module is connected to a module located at the input edge, the output pins of the module are connected to the legacy module and data streaming is then resumed after the legacy module is commanded to change to a run state.

In order to avoid inconsistent graph states, the graph should be changed in an orderly fashion. In one embodiment, this is achieved by having a single mutual exclusion lock which prevents more than one change to a graph occurring at a time. The module or application that is initiating a change acquires this lock before the changes are commenced. The lock is acquired by an application once all "block" commands are completed. A deadlock could occur when an application has commanded the graph to stop and a module initiating a change is waiting for the single mutual exclusion lock. One way to avoid the deadlock is for the module to execute a multiple wait that specifies that the wait exits if either the single mutual exclusion lock or an event object is set. When the module is asked to stop, it signals the event object. This triggers any wait that is executing so that processing can stop in an orderly way.

Now that the steps taken to add, remove, or replace modules within the filter graph have been explained, the interfaces used to implement dynamic reconfiguration will now be discussed in greater detail. These interfaces are the input pin interface, the output pin flow control interface, the graph configuration interface, and the graph configuration callback interface.

The input pin interface preferably exposed on the input pins is used by modules that allow reconnection to their input pins while the graph is running. The input pin interface contains a set of methods preferably including DynamicQueryAccept, NotifyEndOfStream, and IsEndPin. DynamicQuery- Accept asks an input pin if a preselected media type can be accepted on the next data sample while the filter graph is running with the current connection to the input pin. NotifyEndOfStream is used so that data can be pushed through a part of the filter graph ending with the input pin designated. The input pin notifies that all the data has been pushed through by signaling an event. The IsEndPin is used by an input pin to signal that, by default, reconnection searches should end at this input pin.

The output pin flow control interface is supported by output pins. This interface is used to support application-initiated seamless reconnections in the filter graph while it is running. The output pin flow control interface contains a method preferably including block. Block is called by applications that need to temporarily block the flow of data from an output pin in a filter graph to allow reconnection of that pin.

The graph configuration interface is supported by a filter graph manager. Modules and application use this interface to perform dynamic graph building. The graph configuration interface contains a set of methods preferably including Reconnect, Reconfigure, AddFilterToCache, RemoveFilterFromCache, EnumCacheFilters, GetStartTime, and PushThroughData. Reconnect is used to perform a dynamic reconnection between an input pin and an output pin. Reconnect has flags that can be set to indicate that extra modules should not be inserted while reconnecting, to save any modules removed in a cache, and to use only modules from the cache to enable the reconnection. Reconfigure is also used to call back an application via the graph configuration callback interface's reconfigure method when the mutual exclusion lock is acquired. The application can then perform dynamic graph reconnections. AddFilterToCache is used to put a module into a cache. The pins of a module placed in the cache must be disconnected and the module must be put in a stopped state prior to removing the module from the filter graph. RemoveFilterFromCache is used to remove a module from the cache. EnumCacheFilters enumerates the modules in the cache. GetStartTime is used to get the start time for the last filter graph Run call. PushThroughData pushes through data to a specified input pin using the NotifyEndOfStream method of the input pin interface.

The graph configuration callback interface is implemented by the caller of the Reconfigure method. The graph configuration callback interface contains a set of methods preferably including Reconfigure. Reconfigure allows an application to perform filter graph reconfiguration.

A method to dynamically reconfigure multimedia streaming processing modules has been described. In one embodiment, interfaces are used that allow applications and modules to seamlessly change the configuration of streaming processing modules by adding, removing, or replacing processing modules and that allow modules at the beginning of the portion of a streaming path being changed to resume operation as soon as the modules are reconnected to other modules. The modules that are affected by the reconfiguration complete data processing before being stopped, thereby avoiding the need to flush data and lose data.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. In a device that processes streaming data, an interface for enabling dynamic changing of a streaming data path having a plurality of processing modules comprising:
   a first command to perform a dynamic reconnection between an output pin and an input pin;
   a second command to put a module into a cache;
   a third command to remove a module from the cache;
   a fourth command to enumerate modules in the cache;
   a fifth command to get a start time used when a graph run call was last commanded; and
   a sixth command to push data to a specified pin.

2. The interface of claim 1 wherein the device is a general purpose personal computer.

3. The interface of claim 1 wherein at least one of the modules is for processing a first video stream.

4. The interface of claim 3 wherein at least one of the modules is for processing a second video stream containing a different type of video data than the first video stream.

5. The interface of claim 1 wherein at least one of the modules is for processing a first audio stream.

6. The interface of claim 5 wherein at least one of the modules is for processing a second audio stream containing a different type of audio data than the first audio stream.

* * * * *